United States Patent [19]
Suzuki et al.

[11] 3,779,595
[45] Dec. 18, 1973

[54] PILLAR FOR A BODY OF A MOTOR VEHICLE

[75] Inventors: Ichiro Suzuki; Takashi Saito, both of Toyota, Japan

[73] Assignee: Toyota Jidosha Kogyo Kabushiki Kaisha, Toyota-cho, Soyota-shi, Aichi-ken, Japan

[22] Filed: July 10, 1972

[21] Appl. No.: 269,922

[30] Foreign Application Priority Data
Oct. 23, 1971  Japan.............................. 46/84057

[52] U.S. Cl............................. 296/28 R, 280/150 B
[51] Int. Cl. ...................... B62d 25/04, B60r 21/02
[58] Field of Search ................ 296/28 R; 280/150 B

[56] References Cited
UNITED STATES PATENTS
3,132,891  5/1964  Pyuro et al........................ 296/28 R
3,659,476  5/1972  Wilfert et al................ 280/150 B X

*Primary Examiner*—Evon C. Blunk
*Assistant Examiner*—James W. Miller
*Attorney*—Richard K. Stevens et al.

[57] ABSTRACT

This invention relates to a pillar for a body of a motor vehicle.

The pillar comprises a channel-shaped outer pillar component arranged vertically with its open side facing the inside of the room, a channel-shaped inner pillar component fitted in the outer pillar component with its open side facing the inside of the room, the outer pillar component and the inner pillar component being joined to each other to provide a pillar having a closed space therein, portions of the outer pillar component and the inner pillar component at which they are joined being disposed in the vicinity of a door frame, inner panel or other inner side portion of the room so as not to project much into the room, a protector device disposed with its open side facing the open side of the inner pillar component and its opposite edges being disposed near the portion of the inner pillar component at which it is joined to the outer pillar component, the protector device having a width greater than the width of the outer pillar component and being adapted to undergo plastic deformation when subjected to a force of impact higher than the value at which the protector means is set, and a shock absorber mechanism disposed in a space between the inner pillar component and the protector device so as to connect them together.

4 Claims, 5 Drawing Figures

PATENTED DEC 18 1973 3,779,595

PILLAR FOR A BODY OF A MOTOR VEHICLE

This invention relates to a pillar which may be used either as a center pillar or a quarter pillar for a body of a motor vehicle.

Center pillars disposed in the body of a motor vehicle of the prior art each comprises a channel-shaped outer pillar component formed with webs projecting outwardly from opposite edges and arranged vertically with its open side facing the interior of the body, and an inner pillar component of similar shape also formed with webs projecting outwardly from opposite edges and arranged vertically with its open side juxtaposed to the open side of the outer pillar component.

The outer pillar component and the inner pillar component are connected together by joining the webs thereof as by spot welding to provide a center pillar of box-shape in cross-section. An opening trim formed of a synthetic resinous material is fitted over the outer periphery of the two webs interconnected integrally, with the webs fitted with the opening trim thereover being exposed to the interior of the body of the vehicle.

Quarter pillars for the body of a motor vehicle of the prior art are each generally composed of the same components as center pillars and have a similar construction.

When one motor vehicle collides with a side of another motor vehicle provided with pillars of the aforementioned conventional construction, the head and breast of an occupant of the seat in the other vehicle are caused to strike portions of the pillars exposed to the interior of the body of the vehicle by the force of an impact of collision. Since pillars of the prior art are not provided with means to absorb the energy of the impact of collision, the occupants may have serious injuries from being forced against the pillars in the body of the vehicle at the time of collision. If the occupants are thrown in a longitudinal direction of the vehicle and caused to strike the center pillars or quarter pillars, then there is the danger of their being injured by the webs of the pillars which are of box-shape in cross-section.

No means is provided in motor vehicles having pillars of the prior art for protecting occupants from the aforementioned hazard.

An object of this invention is to provide pillars in the body of a motor vehicle which permit, when one motor vehicle collides with a side of another motor vehicle, the energy of an impact with which the head or breast of an occupant of the last mentioned motor vehicle violently strikes a center pillar or a quarter pillar in the body of the vehicle at the time of collision to be positively and readily absorbed by components of the pillar which undergo plastic deformation when subjected to a high force whereby the safety of the occupant can be guaranteed.

Another object of the invention is to provide pillars in the body of a motor vehicle which obviate the aforementioned disadvantages of pillars of the prior art, and which make it possible to absorb positively and readily by a simple construction the energy of an impact with which the head or breast of an occupant is forced to strike a center pillar or quarter pillar, so that the injury which the occupant of the vehicle suffers can be minimized.

Additional and other objects as well as features and advantages of the invention will become evident from the description set forth hereinafter when considered in conjunction with the accompanying drawings, in which.

Figure 1:
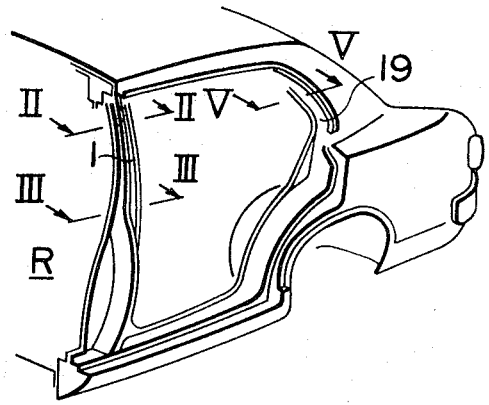
FIG. 1 is a perspective view of one portion of a motor vehicle.
Figure 2:
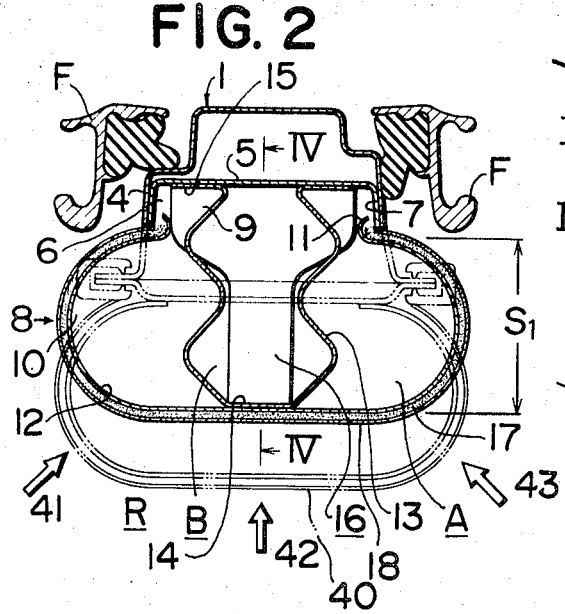
FIG. 2 is a transverse sectional view of an upper portion of the center pillar along the line II—II of FIG. 1.
Figure 4:
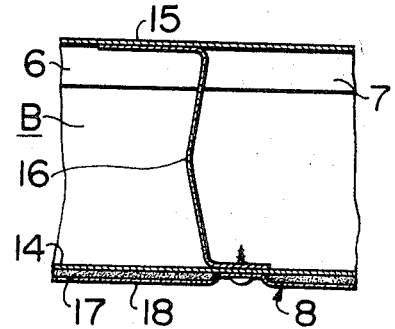
FIG. 4 is a sectional view taken along the line IV—IV of FIG. 2.
Figure 3:
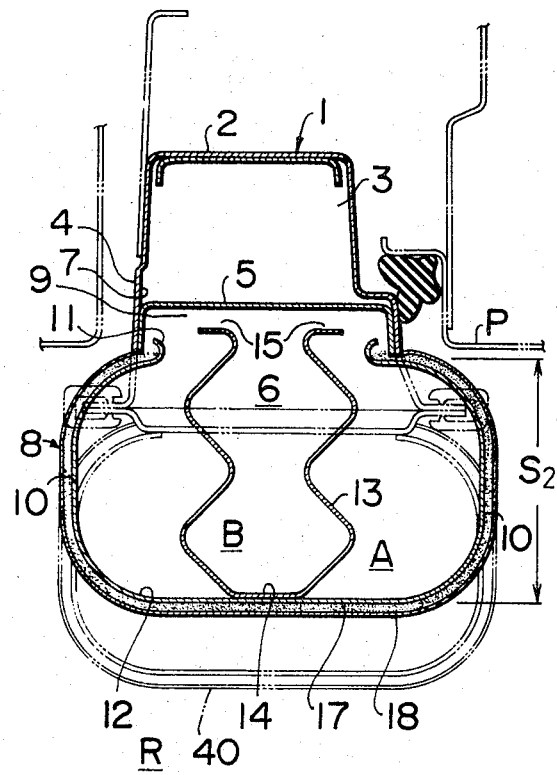
FIG. 3 is a transverse sectional view of a middle portion along the line III—III of FIG. 1.

In FIG. 2 and FIG. 3, a channel-shaped outer pillar component 2 having side walls 4, 4 is arranged vertically with an open side 3 thereof facing a room R in the body of the motor vehicle. A channel-shaped inner pillar component 5 also arranged vertically with an open side 6 thereof facing the room has side walls 7, 7. Inner pillar component 5 is fitted in outer pillar component 2 such that the side walls 7, 7 of the former are positioned adjacent the side walls 4, 4 of the latter. Side walls 7, 7 and 4, 4 are joined as by spot welding or other suitable means to constitute a center pillar 1 provided with a closed inner space.

Joined portions of side walls 7, 7 and 4, 4 which are disposed on the room side are arranged in positions in which they are near to a door frame F or inner panel P. In other words, they are disposed flush with the plane of the inner side of the room R or do not project far into the interior of the room.

Protector means 8 having a width greater than the width of center pillar 1 and formed with arcuate side edge portions 10, 10 arranged symmetrically at right and left sides and formed integrally with each other is arranged in a position in which an open side 9 thereof faces the open side 6 of inner pillar component 5 and in which opposite edges 11, 11 thereof are disposed in the vicinity of side walls 7, 7 of inner pillar component 5.

Protector means 8 is constructed such that when the head of an occupant of the vehicle is thrown thereagainst in any one of the directions indicated by arrows 41, 42 and 43 the protector means 8 is caused to undergo plastic deformation by an impact load applied by the head to thereby absorb the energy of impact.

A plurality of support arm means 16 substantially T-shaped in a plan view as shown in FIG. 2 are arranged in a space A between an inner wall surface 12 of protector means 8 and the open side 6 of inner pillar component 5. Said support arm means 16 are spaced apart from one another and disposed lengthwise of the inner pillar component 5. Each of the support arm means 16 is connected at one end thereof to a bottom surface of inner pillar component 5 and at the other end thereof to the inner wall surface 12 of protector means 8 by suitable means, so that protector means 8 is integrally connected to inner pillar component 5 or center pillar 1 by support arm means 16.

Each of the support arm means 16 is constructed such that when seen from a side it is bent horizontally at upper and lower end portions to be substantially in the form of a letter Z. Support arm means 16 is not readily bent in normal service conditions but it is bent and undergoes plastic deformation simultaneously as protector means 8 undergoes plastic deformation when the latter is subjected to an impact load higher than a predetermined level.

Protector means 8 may be made of steel, light metal or its alloy, or a synthetic resinous material. The outer wall surface 18 or inner wall surface 12 thereof exposed to the inside of the room may have a coat of paint applied thereto or may be provided with a pad 17 shown, and a fancy covering made of synthetic leather may be applied to the outer surface of protector means 8 as a trim.

Shock absorber means 13 comprising a wave-shaped bent plate of proper length may be arranged in the space A between the open side 6 if inner pillar component 5 and the inner wall surface 12 of protector means 8 in place of the aforementioned support arm means 16 or together therewith. Shock absorber means 13 may be also constructed such that when an impact load higher than a predetermined level is applied thereto it undergoes plastic deformation.

Preferably, shock absorber means 13 at an upper portion of center pillar 1 is held in place such that it is joined at a middle portion 14 thereof to the inner wall surface 12 of protector means 8 and at ends 15 thereof to the bottom surface of inner pillar component 5 as shown in FIG. 2 as by spot welding. Shock absorber means 13 at a middle portion of center pillar 1 is held in place such that it is joined at the middle portion 14 thereof to the inner wall surface 12 of protector means 8 by means described above and the ends 15 thereof are spaced apart from the bottom surface of inner pillar component 5 as shown in FIG. 3. By this arrangement, it is possible to increase the capacity of shock absorber means 13 to absorb the force of an impact of collision.

Cushion means comprising foamed material members may be embedded in a space B formed by shock absorber means 13. Alternatively, shock absorber means 13 may be eliminated and the cushion means may be filled in the space A between the inner wall surface 12 of protector means 8 and the open side 6 of inner pillar component 5.

Figure 5:
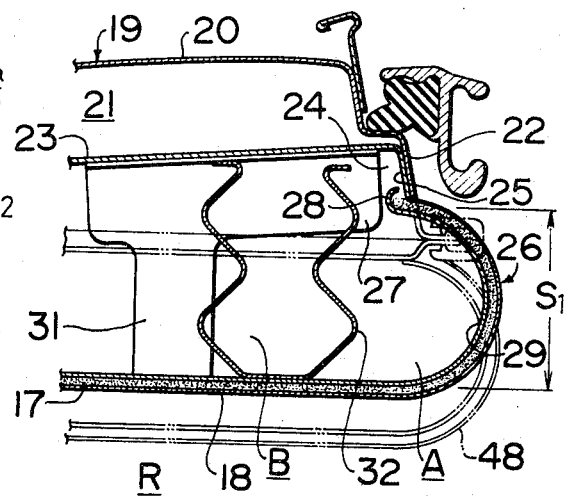
FIG. 5 is a transverse sectional view of a middle portion of the quarter pillar along the line V—V of FIG. 1.

FIG. 5 shows a quarter pillar 19 incorporating this invention which is constructed as presently to be described. Quarter pillar 19 comprises a channel-shaped outer pillar component 20 having side walls 22, 22 and arranged vertically with an open side 21 thereof facing the inside of the room of the vehicle, and a channel-shaped inner pillar component 23 having side walls 25, 25 and arranged vertically with an open side 24 thereof facing the inside of the room. Inner pillar component 23 is fitted in outer pillar component 20 such that the side walls 22, 22 of the latter are disposed ajacent the side walls 25, 25 of the former and joined as by spot welding, so that the inner pillar component 23 and outer pillar component 20 define therebetween a closed space. FIG. 5 shows only one side of the quarter pillar, with the other side being omitted.

Protector means 26 is fitted in inner pillar component 23 such that an open side 27 of the former is juxtaposed to the open side 24 of the latter, with opposite edges 28, 28 (only one of such edges is shown) of protector means 26 being disposed in close proximity to inner surfaces of the side walls 25, 25 of inner pillar component 23. Protector means 26 is formed with arcuate side edge portions 29, 29 arranged symmetrically at right and left sides and project outwardly such that they cover side walls 22, 22 of outer pillar component 20 and the side walls 25, 25 of inner pillar component 23 (only one of such portions is shown).

Support arm means 31 and/or shock abosrber means 32 similar to their counterparts shown and described previously with reference to center pillar 1 are mounted between the open side 24 of inner pillar component 23 and an inner wall surface 30 of protector means 26.

When a motor vehicle collides with a side of another motor vehicle, occupants of the last mentioned motor vehicle will violently strike the center pillars, quarter pillars, window panes of doors or doors at the head and/or breast. In order to prevent the head or breast of an occupant from voilently striking these rigid structures, it may be desirable to provide means having a crush tolerance sufficiently great to absorb the energy of an impact of collision at the sides of these structures disposed on the room side of the motor vehicle.

This invention provides protector means which is adapted to be mounted on center pillar 1 or quarter pillar 19 and effective to positively and readily absorb the energy of a shock when the head or breast of an occupant of the motor vehicle strikes it at the time of collision of the type described. When it is desired to absorb the energy of the impact applied to the head and the breast at decelerations of less than 80 G and 60 G respectively, the amounts of plastic deformation required of the protector means which are its crush allowances can be obtained by the following formulae:

$$S_1 = K_1 \cdot v^2/(2 \times 80\ G)\ K_1 : 1\ to\ 1.5$$

$$S_2 = K_2 \cdot V^2/(2 \times 60\ G)\ K_1 : 1\ to\ 2.5$$

where $V$ is the speed at which the collision occurs, $K$ the coefficient which may vary depending on the material; and $S_1$ and $S_2$ are the amounts of plastic deformation of the protector means which are its crush allowances. Thus, it will be evident that if the protector means is constructed to have the crush allowances obtained from these formulae, then it is possible to provide good protection to the occupants.

If the protector means 8 or 26 according to this invention were mounted on a center pillar 40 or a quarter pillar 48 of the prior art shown in double dot-and-dash lines in FIG. 2, FIG. 3 and FIG. 5, the space in the room in the body of the vehicle would be reduced and impair the comfort of the occupants. Center pillars and quarter pillars according to this invention are constructed such that their inner portions do not protrude much inside the room, so that the provision of the protector means causes substantially no change in the space in the room and the comfort of the occupants is not diminished.

According to this invention, there is provided protector means adapted to be mounted on a center pillar or quarter pillar and disposed inside the room in the body of a motor vehicle, such protector means having a width greater than the width of the inner protion of center pillar 1 or quarter pillar 19, and being constructed such that it is capable of undergoing plastic deformation and thereby absorbing the energy of a force of impact exerted thereon when the force is higher than the level at which the protector means is set, no matter what direction such force may be exerted. It will thus be evident that the subject invention is effective to positively protect the occupants of the motor vehicle from serious injuries when it is involved in a collision in which it is struck at one side thereof by another motor vehicle.

The protector means according to this invention is formed on opposite sides with arcuate side portions disposed symmetrically on the right and left which cover the inwardly projecting portions of center pillar 1 or quarter pillar 19 which is formed with a closed space in the interior. By this arrangement, the hazard of an occupant being thrown violently against the opening trim of small width provided on the webs of a center pillar or quarter pillar of the prior art and suffering injury when the motor vehicle is involved in a head-on or end-on collision can be prevented.

According to this invention, shock absorber means or cushion means may be provided in the protector means to cooperate therewith in absorbing the energy of shock.

This invention offers many advantages. The provision of the protector means does not in any way reduce the space of the room in the body of the motor vehicle. The protector structure according to this invention is simple in construction and low in cost and does not reduce the strength of the vehicle as a whole.

What we claim is:

1. A pillar for a body of a motor vehicle comprising a channel-shaped outer pillar component arranged vertically with its open side facing the inside of the room, a channel shaped inner pillar component fitted in said outer pillar component with its open side facing the inside of the room, said outer pillar component and said inner pillar component being joined to each other to provide a pillar having a closed space therein, portions of said outer pillar component and said inner pillar component at which they are joined being disposed in the vicinity of a door frame, inner panel or other inner side portion of the room so as not to project much into the room, protector means disposed with its open side facing the open side of said inner pillar component and its opposite edges being disposed near the portion of said inner pillar component at which it is joined to the outer pillar component, said protector means having a width greater than the width of said outer pillar component and being adapted to undergo plastic deformation when subjected to a force of impact higher than the value at which the protector means is set, and shock absorber means disposed in a space between said inner pillar component and said protector means so as to connect them together.

2. A pillar as set forth in claim 1 wherein said shock absorber means is support arm means comprising a plurality of members each being substantially in the form of a letter T in a plan view.

3. A pillar as set forth in claim 1 wherein said shock absorber means comprises a plurality of bent plates of the wave-shape.

4. A pillar as set forth in claim 3 wherein at least one of said bent plates of the wave-shape have an inner end which is secured to an inner wall surface of said protector means and an outer end which is slightly spaced apart from a bottom surface of said inner pillar component.

* * * * *